United States Patent [19]

Larson

[11] 4,424,565
[45] Jan. 3, 1984

[54] CHANNEL INTERFACE CIRCUIT WITH HIGH SPEED DATA MESSAGE HEADER FIELD TRANSLATION AND DIRECT MEMORY ACCESS

[75] Inventor: Allen L. Larson, Thornton, Colo.

[73] Assignee: Bell Telephone Laboratories, Incorporated, Murray Hill, N.J.

[21] Appl. No.: 276,074

[22] Filed: Jun. 22, 1981

[51] Int. Cl.³ .............................................. G06F 3/04
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,588,831 | 6/1971 | Figueroa et al. | 364/200 |
| 4,092,715 | 5/1978 | Scriver | 364/200 |
| 4,093,981 | 6/1978 | McAllister et al. | 364/200 |
| 4,133,030 | 1/1979 | Huettner et al. | 364/200 |
| 4,156,907 | 5/1979 | Rawlings et al. | 364/200 |
| 4,189,769 | 2/1980 | Cook et al. | 364/200 |
| 4,225,919 | 9/1980 | Kyu et al. | 364/200 |
| 4,228,496 | 10/1980 | Katzman et al. | 364/200 |

OTHER PUBLICATIONS

*Electronic Design* 12, Jun. 7, 1979, "Data Communications Part Three", pp. 98–104, Alan J. Weissberger.
*The 8086 Family User's Manual*, Oct. 1979, "8237/8237-2, High Performance Programmable DMA Controller", pp. B-92 to B-105.
*Peripheral Design Handbook*, Feb. 1978, "8257/8257-5, Programmable DMA Controller", pp. 1-72 to 1-88.

*Primary Examiner*—Jerry Smith
*Assistant Examiner*—Mark P. Watson
*Attorney, Agent, or Firm*—James M. Graziano

[57] ABSTRACT

The subject channel interface circuit functions in a multiprocessor environment to provide a high speed interface between a processor and the communication channel which interconnects all the processors. The communication channel carries data messages, which messages contain a header field specifying source, destination and control information. The subject channel interface circuit is programmable and serves to dynamically translate the header portion of the data message as it is received and thereby determine whether this data message is to be stored in the processor memory. If the data message is to be stored, the channel interface circuit immediately converts the header field into a hardware address, which is used to activate a specific location in processor memory. The data message is then inputted (via DMA) to this memory location and the appropriate buffer pointers are reset. Thus, the subject channel interface circuit performs all the data receiving tasks, including message storage and linking, without requiring the involvement of the associated processor.

21 Claims, 7 Drawing Figures

| ADDRESS | RAM CONTENTS |
|---|---|
| 0 0 0 0  0 0 0 0 | |
| 0 0 0 0  0 0 0 1 | 1 0 1 0 1 |
| 0 1 1 1  0 0 1 1 | 1 0 1 1 1 |
| 1 0 1 1  1 1 1 1 | 1 1 0 0 0 |
| 1 1 1 1  1 1 1 1 | |

CLASS-k
CLASS-1

FIG. 7

| ADDRESS | RAM CONTENTS |
|---|---|
| 0 0  0 0 0 | |
| 1 0  1 0 1 | 1 1 0 1 1 1 0 0 |
| 1 0  1 1 1 | 1 0 0 0 0 1 0 0 |
| 1 1  0 0 0 | 0 0 0 0 0 0 1 0 |
| 1 1  1 1 1 | |

DMAA

CHANNEL INTERFACE CIRCUIT WITH HIGH SPEED DATA MESSAGE HEADER FIELD TRANSLATION AND DIRECT MEMORY ACCESS

This application is related to an application of A. L. Larson, Ser. No. 276,060, entitled Channel Interface Circuit Providing Virtual Channel Number Translation and Direct Memory Access filed on the same date hereof.

FIELD OF THE INVENTION

This invention relates to interface circuits, and in particular, to a channel interface circuit which serves to interconnect a communication channel with a processor and its associated memory. The subject channel interface circuit provides a high speed interface which carries data messages from the communication channel to the processor memory without requiring the intervention of the associated processor.

DESCRIPTION OF THE PRIOR ART

Prior art interface circuits which interconnect a processor and a communication channel are used merely as a buffer. They function to store data messages which appear on the communication channel and generate an interrupt each time a data message is received. The difficulty with this arrangement is that the processor spends an inordinate amount of real time serving the interrupts from the interface circuit. A significant portion of this real time is expended in decoding the header of the data message to determine whether the data message is destined for the associated processor and, if so, where in the processor memory the data message is to be stored. Each data message appearing on the communication channel in the Ethernet class of communication systems includes a header field which typically contains 14 bytes of information, all of which must be decoded. The decoding of this header field entails the expenditure of a significant amount of processor real time. Prior art interface circuits do nothing to expedite this decoding process and, in fact, most prior art interface circuits have little built-in intelligence and serve merely as a simple buffer, thereby requiring the processor to accomplish both the decoding of the header and the storage of the data message tasks. Heretofore this has not been a significant problem since the processors are generally either not real time limited or are operating in a batch processing mode. However, in business communication systems this prodigal expenditure of real time is a significant impediment to achieving the necessary system performance.

SUMMARY OF THE INVENTION

The subject channel interface circuit acts as a message handler which functions to provide a high speed interface between a processor memory and a data communication channel. The communication channel carries data messages having a header field which specifies a source address, a destination address and control information. The subject channel interface circuit is programmable and serves to dynamically translate the header portion of the data message as it is being received and thereby determine whether this data message is to be stored in the processor memory. This determination is completed as soon as the header field is received. If the data message is to be stored, the subject channel interface circuit immediately converts the header field into a hardware memory address, which address is used to activate a specific location in the processor memory. The data portion of the data message is then directly inputted (DMA) as it is received to this memory location and the appropriate buffer pointers are reset. Only when a complete data message has been received and stored in the processor memory does the channel interface circuit generate a processor interrupt to inform the processor that a complete data message is now stored in its memory. Thus, the subject channel interface circuit performs all the data receiving tasks including message storage and linking without requiring the involvement of the associated processor. This saves processor real time and increases the speed of the effective data transfer between the communication channel and the processor since there is no delay while the processor is required to access every data message, decode the header field and, if the data message is to be accepted, either store same in its memory or provide address information identifying where the data message should be stored. Additionally, since the subject channel interface circuit is programmable and the data messages contain source, destination and control information, the subject channel interface circuit can selectively "tune out" data messages from various sources, provide special handling of data messages and perform other such tasks as will be described below.

BRIEF DESCRIPTION OF THE DRAWINGS

Figure 1:
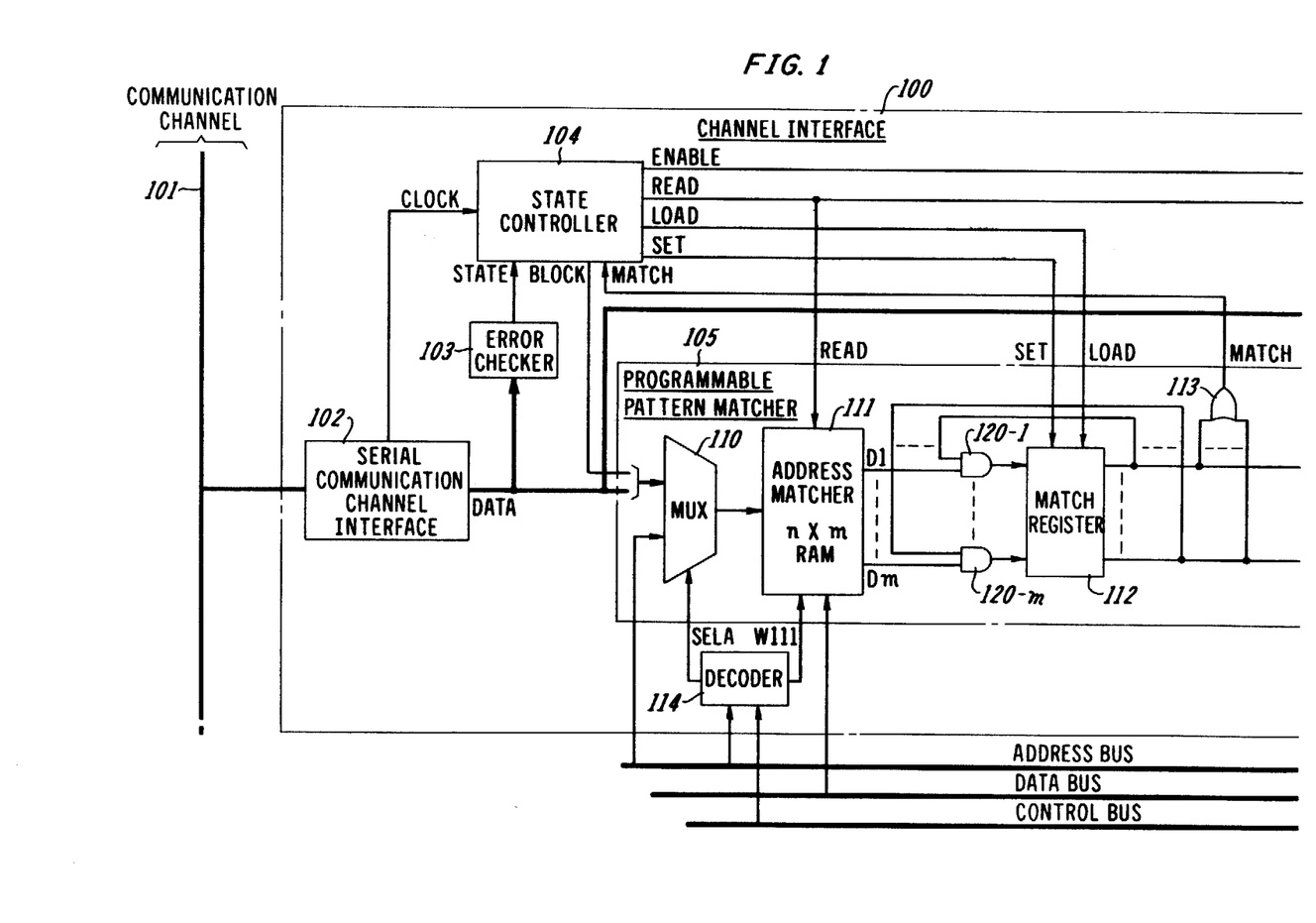
Figures 2, 3:
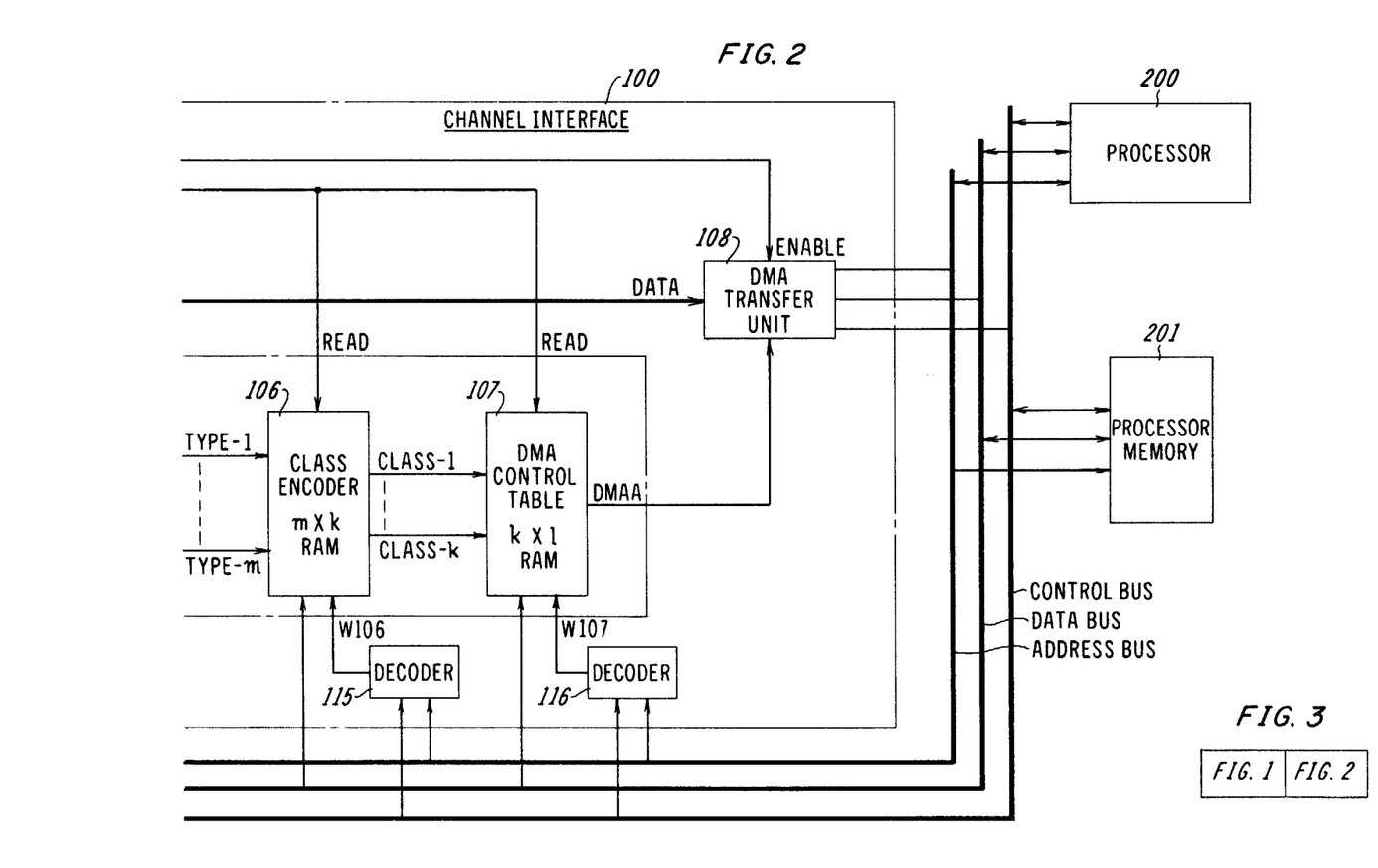

FIGS. 1 and 2 illustrate the channel interface circuit of my invention;

FIG. 3 illustrates the manner in which FIGS. 1 and 2 are arranged;

DETAILED DESCRIPTION, FIGS. 1 and 2

The subject channel interface circuit 100 serves to interface a communication channel 101 with a typical general purpose processor 200 and the processor memory 201 via the address, data and control busses of processor 200. It is assumed that communication channel 101 carries Ethernet-type data messages having a header field which specifies the source address, the destination address and control information. Channel interface circuit 100 monitors communication channel 101 to determine whether one of these data messages is destined for processor memory 201. If this is the case, channel interface circuit 100 stores the data messages that are received from communication channel 101 directly in processor memory 201 without requiring the involvement of processor 200.

The subject channel interface circuit 100 is connected to communication channel 101 via serial communication channel interface 102 which serves a number of functions, among which is clock recovery, bit recovery and framing. Serial communication channel interface 102 would be of a design that is appropriate for the type of signals appearing on communication channel 101. Serial communication channel interface 102 would be either a data modem circuit if communication channel 101 were to carry analog signals, or a digital interface circuit of a type that is well-known if the art if digital data were carried by communication channel 101. It is assumed for this description that communication channel 101 is a serial data channel and the messages appearing thereon are received by serial communication channel interface 102 on a bit by bit basis. Therefore, serial communication channel interface 102 derives a clock signal in well-known fashion by monitoring the digital bits that are transmitted on communication channel 101. These derived clock signals are transmitted from serial communication channel interface 102 on lead CLOCK to state controller 104 of channel interface circuit 100. State controller 104 is a logic circuit which functions to convert this clock signal to the various timing and control signals that are required for the coherent operation of the remaining circuitry of channel interface circuit 100.

Serial communication channel interface 102, in receiving the digital bits from communication channel 101, reshapes these bits and converts the serial data transmission to a series of bytes (or other suitable width) of parallel representation of data. Once a full byte is received, it is transmitted in parallel fashion by serial communication channel interface 102 on bus DATA to the remaining circuitry of channel interface circuit 100. The data portion of each data message that is received is transmitted on bus DATA to DMA transfer unit 108 where the data is stored for eventual relocation to processor memory 201.

ERROR CHECKER

Figure 4:
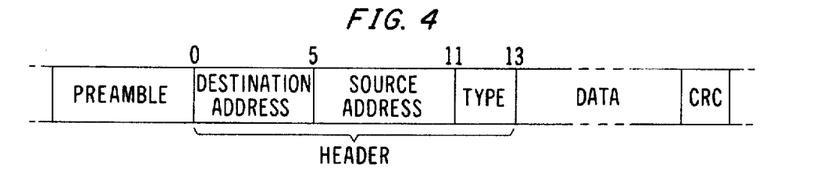
FIG. 4 illustrates the structure of a typical data message.

In the meantime, error checker 103 monitors the bits that are being transmitted on bus DATA to determine whether there are any transmission errors contained therein. Error checker 103 contains a cyclic redundancy check circuit or other error detection circuit of a type well-known in the art, which circuit accumulates a running sum indication of the bits already received and this sum must agree with the transmitted CRC signal appearing at the end of the data message (as shown in FIG. 4) for the data to be construed as valid. The results of this check are transmitted by error checker 103 on lead STATE to state controller 104 where the error state indication is used to either enable or disable the transfer of the received data message to processor memory 201.

HARDWARE ADDRESS GENERATION

Programmable pattern matcher 105 monitors the header field of the data message appearing on bus DATA, determines whether the data message is to be stored in processor memory 201 and converts the header field to a particular hardware address if the data message is to be stored in processor memory 201. The selection of a hardware address is determined by the source address, destination address and control information contained in the header field of the data message. This is accomplished when the header field of the data message is applied, on a byte-by-byte basis, to bus DATA by serial communication channel interface 102. As each byte of the header field is applied to bus DATA, state controller 104 concurrently outputs a byte identification code on bus BLOCK. Multiplexer 110 of programmable pattern matcher 105 switches both the byte code and the header byte to address matcher 111 where the header field is compared on a byte-by-byte basis to a number (m) of acceptable header field patterns. The results of these byte-by-byte comparisons are transmitted by address matcher 111 on leads Dl–Dm through AND gates 120-1 to 120-m. These AND gates 120-1 through 120-m, in conjunction with match register 112, instantaneously indicate at the conclusion of the header field whether any acceptable header field patterns have been received. This match indication is supplied by match register 112 providing an m bit pattern on leads TYPE-1 to TYPE-m to show which of the m acceptable header field patterns stored in address matcher 111 corresponded to the received header field. This m bit pattern is transmitted to class encoder 106 which converts the m bits to a k bit signal which is outputted on leads CLASS-1 to CLASS-k to DMA control table 107 to indicate which of the 2k possible classes of information has been received. DMA control table 107 contains a cross reference between classes of information and hardware address locations where this information is to be stored. Thus, when a class signal is received from class encoder 106 on leads CLASS-1 to to CLASS-k, DMA control table 107 converts this class indication to a hardware address which is transmitted on bus DMAA to DMA transfer unit 108. Since at least one match occurred between the header field of the data message and the m header field patterns stored in address matcher 111, a match indication signal is generated by OR gate 113 and transmitted to state controller 104 on lead MATCH. State controller 104, in response to a predetermined status of the error signal on lead STATE and the match signal on lead MATCH, at the appropriate time, generates an enable signal on lead ENABLE which causes DMA transfer unit 108 to request from processor 200 access to the processor data, address and control busses. When access permission is granted by processor 200, DMA transfer unit 108 transmits the hardware address that has been received from DMA control table 107, along with the data portion of the received data as it is received, (the first few bits of this data have been stored in DMA transfer unit 108) onto the appropriate processor busses. Processor memory 201 receives this address, control and data information on the associated processor busses and stores the entire data message in the hardware location indicated. Once this is accomplished, DMA transfer unit 108 generates a processor interrupt, applies this signal to the processor control bus to inform processor 200 of the data message stored in processor memory 201.

In the description of the subject channel interface circuit 100, it was assumed that the memory elements of programmable pattern matcher 105 (address matcher 111, class encoder 106, and DMA control table 107) all contain conversion information to recognize a match and then to generate the address in processor memory 201 where this received data message is to be stored. These units are initialized and updated by processor 200 by way of the processor control, address and data busses as indicated in FIGS. 1 and 2. As will be discussed later in the specification, processor 200 loads bit patterns into the memory elements of programmable pattern matcher 105 (address matcher 111, class encoder 106 and DMA control table 107) to indicate the types of messages that are to be received from the sources that are presently of interest and also to indicate where these messages are to be stored in processor memory 201.

CHANNEL INTERFACE CAPABILITIES

Channel interface circuit 100 functions to interconnect communication channel 101 with processor memory 201. As mentioned above, the reason for this interface is to relieve processor 200 of the burden of supervising the receipt, decoding and storage of data messages transmitted on communication channel 101 to processor memory 201. Channel interface circuit 100 accomplishes this function as described in general fashion above by receiving the data message, generating a hardware address based on the header field contained in this data message and then using this hardware address to access a particular segment of memory in processor memory 201 and store the data message therein. Channel interface circuit 100, in performing these tasks, has additional capabilities that are not evident from the above general description. In particular, it can be said that there are three classes of messages that appear on communication channel 101. These classes are speciality messages, community messages, and broadcast messages. The speciality messages are data messages that are addressed specifically to processor 200 and are, in turn, to be stored in processor memory 201. However, there are many cases when processor 200 may wish to "tune out" data messages from certain sources and therefore provide a selective listening connection to communication channel 101. This capability is inherent in channel interface circuit 100 as will be described below. The same selective listening capability can be employed on the remaining two classes data messages. The community message is a message transmitted to a class or subgroup of processors all having an interest in the content of the data message. In these data messages, the destination address may very well be a generalized address indicating a large cross section of the processors which are connected to communication channel 101. An extension of this class of messages are the broadcast messages which are transmitted to all processors having access to communication channel 101. Channel interface circuit 100 has the capability to identify these various types of messages, assign a priority to each and store them in various portions of processor memory 201. To illustrate these capabilities of channel interface circuit 100 it is advantageous to describe in detail the processing of a data message received from communication channel 101 and the storage of same in processor memory 201.

TABLE LOADING

The logical place to begin this discussion is with the loading of the various tables contained in channel interface circuit 100. It is standard structure in the processor art for processor 200, processor memory 201 and channel interface circuit 100 to be interconnected via the collection of processor busses which are illustrated on FIGS. 1 and 2 (address bus, data bus, and control bus). Processor 200, processor memory 201 and the associated processor busses are elements that are all well-known in the art and whose operation in this system are routine. As can be seen from FIGS. 1 and 2, programmable pattern matcher 105 of channel interface circuit 100 contains three memory devices: address matcher 111, class encoder 106, and DMA control table 107, all of which are shown as RAM memory in the preferred embodiment. Memory devices 111, 106 and 107 contain the tables that respectively provide the above-mentioned header matching/selective listening, class identification and address generation functions. These tables are generated and maintained by processor 200 via the processor control, address and data busses which interconnect these devices.

In particular, processor 200, by applying the appropriate signals on the processor control and address busses, enables memory device 111 to receive and store data from the processor data bus. Decoder 114 is connected to the processor address and control busses and functions to monitor these processor busses for address signals identifying address matcher 111 and control signals signifying that processor 200 wishes to write data into address matcher 111. When these signals concurrently appear on the respective processor busses, decoder 114 places the appropriate activation signals on leads SELA and Wlll. The signal on load SELA causes multiplexer 110 to connect the processor address bus to the address leads of address matcher 111. The aforementioned signal on lead Wlll places address matcher 111 in the write enable mode. Thus, processor 200 is directly connected to the address and data leads of address matcher 111 via the processor address and data busses respectively. Processor 200 now loads the appropriate entries into address matcher 111 in a well-known fashion. When this operation is complete, processor 200 applies the appropriate signals to the processor control bus, thereby causing decoder 114 to remove the activation signals from leads SELA and Wlll. The removal of these activation signals causes multiplexer 110 to connect channel interface circuit 100 internal bus DATA to the address leads of address matcher 111 and prevents any new information from being written into address matcher 111 by disabling memory write enable lead Wlll.

Figure 5:
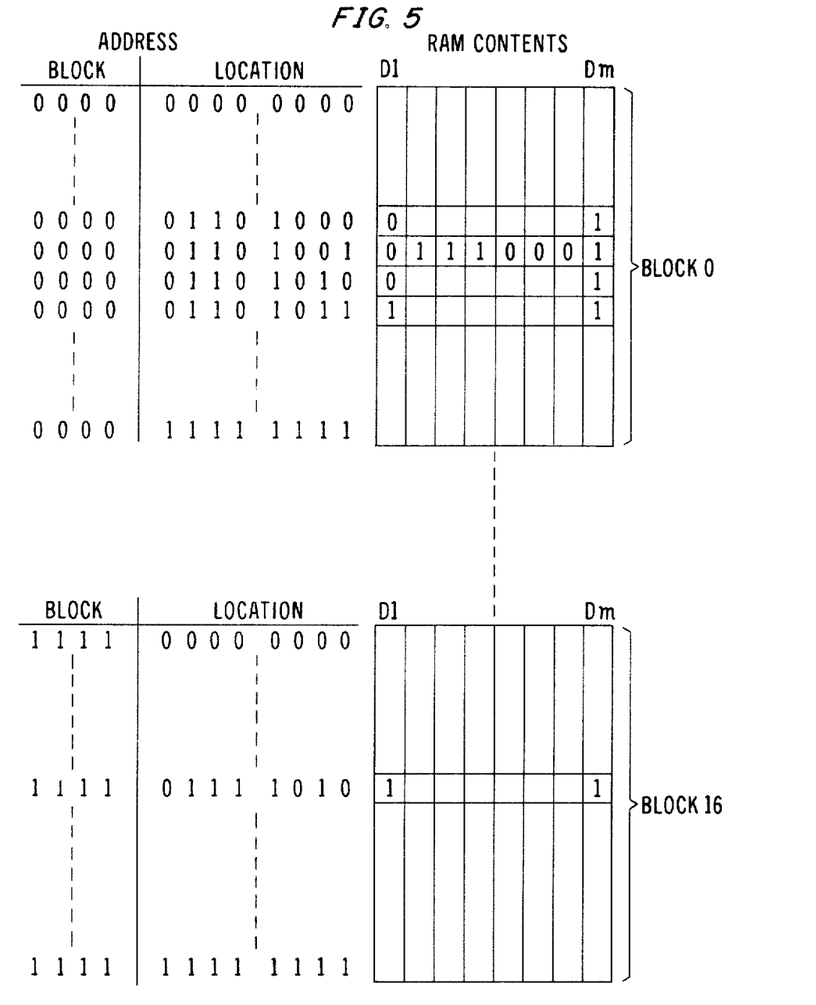
FIGS. 5-7 illustrate typical entries in the three RAM memories of the subject channel interface circuit.

This above-described memory loading operation is well-known in the art and a typical entry in address matcher 111 is illustrated in FIG. 5 wherein the left hand column labeled "address" indicates a particular memory location in address matcher 111 while the right hand column of FIG. 5 labeled "RAM contents" indicates the data that is stored in address matcher 111 in the corresponding address location. In similar fashion, processor 200 can access class decoder 106 and DMA control table 107, similarly loading them with data, examples of which can be seen in FIGS. 6 and 7 respectively. The use of this data and these memory devices will become apparent to the reader as we discuss the processing of a typical data message.

SERIAL COMMUNICATION CHANNEL INTERFACE

Serial communication channel interface 102 of channel interface circuit 100 is directly connected to communication channel 101 and functions to receive the data messages that appear thereon. As was proposed above, communication channel 101 carries digital data messages in serial fashion and, therefore, serial communication channel interface 102 would be an appropriate digital interface circuit which is well-known in the art. In particular, in Electronic Design Magazine of June 7, 1979, there appeared an article entitled, "Data Communications: Part Three", by Alan J. Weissberger (pages 98-104) wherein a typical channel interface circuit is described. The receiver/transmitter circuit described in this publication is a well-known circuit element which would be of the type to be used to implement serial communication channel interface 102. This circuit functions in well-known fashion to receive the serial digital data signals appearing on communication channel 101, reshape these signals for use in channel interface circuit 100 and extract a clock signal from these digital data signals. The clock signal derived from the digital data message is applied to lead CLOCK by serial communication channel interface 102 and this signal is used as mentioned above, by state controller 104 to supply the timing and control signals for channel interface circuit 100.

STATE CONTROLLER

State controller 104 is a logic circuit which uses the clock signal from lead CLOCK and the feedback signals on leads STATE and MATCH to control the operation of the various elements of channel interface circuit 100. It is counterproductive in this description to describe in extensive detail the implementation of state controller 104, since the design of this circuit is highly dependent on the particular off-the-shelf circuit elements selected to implement the various portions of channel interface circuit 100. The implementation of the appropriate design of state controller 104 is well within the skill of the average practitioner of the circuit design art and it will be left to the designer to implement this circuit using the most economical off-the-shelf components possible. Similarly, error checker 103 is a standard error checking circuit which monitors the received data message for transmission errors and which signifies the result of this check operation to state controller 104 via lead STATE.

PROGRAMMABLE PATTERN MATCHER

As the serial data message is received by serial communication channel interface 102, it is applied to programmable pattern matcher 105 via bus DATA. This data message has been assumed to be an Etherenet-type of data message structure as illustrated in FIG. 4. The header field of the data message typically contains six bytes of source address, six bytes of destination address and two bytes of control information to indicate the type of message. It is this header field that is used by programmable pattern matcher 105 to determine if the associated data message is destined for processor 200 and, if so, where it is to be stored in processor memory 201. The data portion of the data message is of some arbitrary length and is of no interest to programmable pattern matcher 105. The data is therefore directly transmitted to DMA transfer unit 108 via bus DATA where it is temporarily stored in a buffer. The header field decoding operation begins when serial communication channel interface 102 receives the first bits of the first byte of the header field of the data message and generates a framing signal to indicate the start of a message. State controller 104 responds to the framing signal by activating lead SET, thereby resetting match register 112 of programmable pattern matcher 105. Match register 112 is an m bit register which serves to store the signals output by gates 120-1 to 120-m. The signal on lead SET causes match register 112 to reset and therefore an output signal of logic 1 appears on all of leads TYPE-1 to TYPE-m. These leads are each connected to an input terminal of the corresponding one of AND gates 120-1 to 120-m and this configuration serves as a memory element since a logic 0 signal appearing on any of leads D1 to Dm will cause the associated AND gate and bit position of match register 112 to change state to a logic 0, which signal persists until state controller 104 again places an activation signal on lead SET. The utility of this circuit configuration will be apparent in the following description.

HEADER MATCHING

The header of the data message, as described above, comprises 14 bytes of information and it is assumed that each byte consists of eight bits of digital data. A problem with this arrangement is that 14 is a difficult number to work with in the binary number system, so programmable pattern matcher 105, as disclosed, works with 16 bytes (14 bytes of the header field and the first two bytes of data) to simplify the circuit design. The two bytes of data can be ignored, if desired, thereby decoding just the 14 bytes of the header field.

As the data message is received from communication channel 101, serial communication channel interface 102 outputs the header on a byte-by-byte basis on bus DATA. State controller 104 concurrently outputs an address on bus BLOCK, thereby providing an address of 12 bits: 8 bits (1 byte on bus DATA and 4 bits on bus BLOCK to address matcher 111 via multiplexer 110. The need for twelve bits of address becomes evident when FIG. 5 is examined. Address matcher 111 is shown in FIG. 5 to be an nxm RAM memory device and n is designated above to be 12 bits. For the sake of illustration, assume that m is equal to eight. Therefore, address matcher 111 is a 4K×8 RAM device or an equivalent collection of devices (since 12 bits can be used to address 4K memory locations). The illustration in FIG. 5 shows two segments of address matcher 111, one labeled as BLOCK 0 and the other labeled as BLOCK 15. The block number identifies the particular byte of the data message header field and, as mentioned above, there are sixteen bytes that are decoded by programmable pattern matcher 105. Within each byte of the header field are eight bits and these are shown on FIG. 5 under the heading LOCATION and these specify the 256 possible bit combinations for the 8 address bits.

In operation, a twelve bit address is applied to address matcher 111 with state controller 104 identifying the particular byte of the header field via the four bits of information on bus BLOCK. The first byte received will be BLOCK 0000 and typical memory entries are illustrated in FIG. 5 for memory locations 01101000–01101011 of this block. In particular, for each address location there are m (in this case 8) bits stored in memory and these m bits represent m possible match combinations. Thus, for the address locations illustrated, column D1 of block 0 shows a stored only in memory location 01101011, thereby indicating a match occurs only when this memory location is identified in this byte of the header field. Since the first two bytes of the header field comprise the destination address, this bit pattern in column D1 represents the situation where the data message is acceptable only when it is destined for the processor addressed by 01101011. This situation can be compared with the entries in column Dm where there is a 1 entry for all four memory locations illustrated. This indicates that any message transmitted to a processor identified by the designation 011010XX will be received (where XX indicates positions of don't care bits). This is a typical community or broadcast message, where any one of a class or group of processors may receive the data message.

For the sake of illustration, assume that the first byte of the header field comprises the bits 01101001. Since this is the first byte, state controller 104 outputs bits 0000 on bus BLOCK and address matcher 111 outputs on leads D1–Dm the m bits (01110001) shown on FIG. 5 for address 01101001. In particular, lead D1 will have a logic 0 signal thereon, which signal causes AND gate 120-1 to produce a logic 0 output signal. Similarly, lead Dm will have a logic 1 signal thereon, which signal causes AND gate 120-m to produce a logic 1 output signal. State controller 104 at this time generates an activation signal on lead LOAD which signal causes match register 112 to store the signals which are being transmitted by AND gates 120-1 through 120-m. As described above, this circuitry serves as a memory element, storing any indications of a failure to match (a logic 0) as is the situation with gate 120-1.

PATTERN MATCH—CLASS ENCODER

Figure 6:
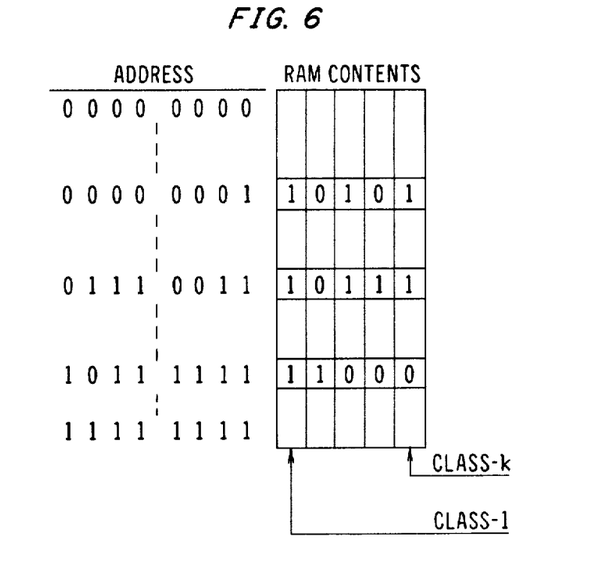

State controller 104 sequentially changes the signals on bus BLOCK as each successive byte of the header field is received until the final byte (byte 16) is received. FIG. 5 illustrates a typical table entry for a final byte of the header field (block 15) consisting of the address bits 01111010. As was described above, there was a mismatch on match combination D1 in byte 0 so a match for this byte in block 16 is insufficient to change the logic 0 stored in match register 112. However, match combination m in column Dm shows a match and, assuming no mismatches occurred in the other bytes received, match register 112 will store a logic 1 for this position, indicating a successful match for match combination m. An indication of a match is transmitted to state controller 104 via OR gate 113 and the appropriate logic signal on lead MATCH. State controller 104 responds to the positive match indication on lead MATCH by enabling lead READ. Match register 112, enabled by lead READ, transmits its contents to the address leads of class encoder 106 via leads TYPE-1 to TYPE-m. This data transmitted by match register 112 indicates how many matches occurred and also which match combinations these were. For the sake of illustration, assume that the only match that occurred was in position m so that leads TYPE-1 to TYPE-m have the following signal appearing thereon: 00000001. FIG. 6 illustrates the table contents of class encoder 106 for various addresses. Class encoder 106 functions as a priority encoder, translating the number and type of matches into a class indication, thereby identifying the one of $2^k$ regions of memory or classes of information stored therein that the received data message is associated with. Class encoder 106 is implemented by an m×k RAM and for the sake of illustration, k has been selected to be five, thereby yielding 32 distinct classes of messages (i.e., $2^5$). In response to the above-mentioned activation signal on lead READ, class encoder 106 outputs the data stored in memory location 00000001, which in this case is 10101. This bit pattern is outputted on leads CLASS-1 to CLASS-k to the address leads of DMA control table 107.

HARDWARE ADDRESS—DMA CONTROL TABLE

Figure 7:
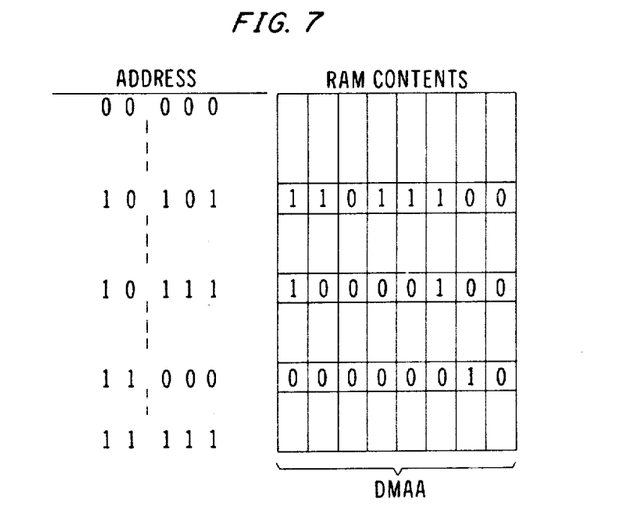

FIG. 7 illustrates some typical table contents of DMA control table 107, which circuit functions as a hardware address generator, responding to a class indication applied to its address leads by transmitting an l bit address. In the subject example, l=8 and a class indication of 10101 causes DMA control table 107 to transmit the 8 bit address 11011100 on bus DMAA to DMA transfer unit 108. State controller 104 activates lead ENABLE either upon receipt of the match signal or upon the completion of the data message and the receipt of an appropriate signal from error checker 103 on lead STATE, indicating the receipt of an error free message. There are two DMA operations possible here: storage of the data message as it is being received since programmable pattern matcher 105 completes the header field decoding and address generation as soon as the header field is received, or performing a transfer to processor memory 201 only after the complete data message has been received. For the purpose of this description, assume that the data message is stored as received. DMA transfer unit 108 is then ready to directly store the data message in processor memory 201 as soon as the header field is decoded. DMA transfer unit 108 has already stored the initial (header) portion of the data message in an internal buffer and has received a hardware address via bus DMAA. Thus, DMA transfer unit 108 requests access to the processor control, address, and data busses and, when access is granted by processor 200 in well-known fashion, DMA transfer unit 108 selects the identified portion of processor memory 201 (address 11011100) and stores the data message therein as it is being received. Upon completion of this data transfer, the addresses stored in DMA control table 107 and possibly the table information stored in address matcher 111 and class encoder 106 must be updated. This is accomplished, as described above, by processor 200. An alternate update method is to have DMA transfer unit 108 update the data in DMA control table 107 to reflect the new starting address for data storage based on the data message just stored in processor memory 201. In this discussion, we have assumed a number of capabilities for DMA transfer unit 108 and these capabilities are all well-known in the art. There are numerous off-the-shelf DMA transfer units available and typical units are: the 8237 High Performance Programmable DMA Controller which is described on pages B-92 to B-105 of "The 8086 Family User's Manual—October 1979", published by Intel Corporation and the 8257 Programmable DMA Controller which is described on pages 1-72 to 1-88 of the "Peripheral Design Handbook—February 1978", published by Intel Corporation.

Thus, the three memory devices: address matcher 111, class encoder 106, and DMA control table 107 each provide a capability to programmable pattern matcher that heretofore has not been available in the art. In particular, address matcher 111 instantaneously decodes the header field and determines whether the message transmitted on communication channel 101 is directed to processor 200 and whether processor 200 wishes to receive this type of communication from the source originating this data message. Class encoder 106 ascribes a priority or class to the received data message and finally, DMA control table 107 generates a hardware address representative of both the type of message received and the and the source of the information. All of this processing is being done on a byte-by-byte basis, so that at the conclusion of the header field, the hardware address is immediately available for use in storing the data in processor memory 201. Processor 200 is able to uninterruptedly continue its operation throughout this entire data message receiving process.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a data communication system having a communication channel (101) which carries data messages to a processor (200) having data, address, and control busses and an associated memory (201) connected to said data, address and control busses, a channel interface circuit (100) for interconnecting said data, address and control busses with said communication channel (101) comprising:

interface means (102) connected to said communication channel (101) and responsive to said data message, which contains a header field having address and control portions, appearing on said communication channel (101) for outputting said data message as received on a byte-by-byte basis;

pattern matcher means (105) connected to said interface means and responsive to only said header field of said data message for generating a hardware address as the last byte of said header field is received to identify the location in said associated processor memory (201) wherein said data message is to be stored if said processor (200) is the designated destination of said data message;

incoming state controller means (104) responsive to said last byte of said header field as it is being received for seizing said data, address and control busses;

driver means (108) connected to said processor address bus and said pattern matcher means (105) and responsive to said hardware address for transmitting said hardware address on said processor address bus to activate said identified memory store location in said associated processor memory (201); and wherein said driver means (108) is also connected to said interface means (102) and said processor data bus and is responsive to said hardware address for directly storing, as received, the data portion of said data message as outputted by said interface means (102) in said activated memory store location via said processor data bus.

2. The invention of claim 1 wherein said pattern matcher means (105) includes:

address matcher means (111) connected to said interface means (102) and responsive to said header field of said data message for comparing on a byte-by-byte basis as received each byte of said header field to m match patterns of hardware addresses stored in said address matcher means (111), where m is an integer; and wherein said address matcher means is responsive to each of said comparisons for generating a byte-by-byte match or no match signal.

3. The invention of claim 2 wherein said pattern matcher means (105) includes:

match register means (120-1 to 120-m, 112) connected to said address matcher means (111) and responsive to said byte-by-byte match or no match signals for generating an m bit match sum signal (TYPE1-TYPEm) indicative of the cumulative status of the m match pattern comparisons.

4. The invention of claim 3 wherein said pattern matcher means (105) includes:

class encoder means (106) connected to said match register means (102-1 to 120-m, 112) and responsive to said m bit match sum signal (TYPE1-TYPEm) for generating a k bit class signal (CLASS1-CLASSk) categorizing the header field portion of said data message into one of $2^k$ possible classes of information.

5. The invention of claim 4 wherein said pattern matcher means (105) includes:

DMA table means (107) connected to said class encoder means (106) and responsive to said k bit class signal (CLASS1-CLASSk) for generating said hardware address.

6. The invention of claim 5:

wherein said DMA table means (107) is connected to said processor data, address and control busses and is responsive to signals appearing thereon for storing hardware address information therein as determined by said processor (200) operating under control of a predefined algorithm stored in said processor.

7. The invention of claim 4 wherein:

said class encoder means (106) is connected to said processor data, address and control busses and is responsive to signals appearing thereon for storing class translation information as determined by said processor (200) operating under control of a predefined algorithm stored in said processor.

8. The invention of claim 2 wherein:

said address matcher means (111) is connected to said processor data, address and control busses and is responsive to signals appearing thereon for storing match patterns as determined by said processor (200) operating under control of a predefined algorithm stored in said processor.

9. The invention of claim 1:

wherein said state controller means (104) is responsive to said interface means (102) for generating a block address signal (BLOCK) indicative of which byte of said header has last been received by said interface means (102).

10. The invention of claims 2 or 9:

wherein said pattern matcher means (105) is responsive to said block address signal (BLOCK) for simultaneously comparing said last received byte of said header with a corresponding byte of each of said m match patterns stored in said address matcher means (111).

11. In a processor communication system having a communication channel (101) which carries data messages to a processor (200) having data, address and control busses and its associated memory (201) connected to said data, address and control busses, a channel interface circuit (100) for interconnecting said data, address and control busses with said communication channel (101) comprising:

interface means (102) connected to said communication channel (101) and responsive to said data message, which includes a header field having address and control portions, appearing on said communication channel (101) for transmitting said data message as received on a byte-by-byte basis;

pattern matcher means (105) connected to said interface means (102) and responsive to only said header field of said data message for generating a match signal on a byte-by-byte basis as each byte of said header portion is received if that byte indicates that said processor (200) is the designated destination of said data message;

wherein said pattern matcher means (105) includes DMA table means (107) responsive to the last byte of said header field for generating a hardware address identifying the location in said processor memory (201) wherein said data message is to be stored if said match signals indicate that said processor (200) is the designated destination of said data message;

incoming state controller means (104) responsive to said last byte of said header field as it is being received for seizing said data, address and control busses;

DMA transfer means (108) connected to said processor address bus and said DMA table means (107) and responsive to the receipt of said header field of said data message for transmitting said hardware address on said processor address bus to activate said identified memory store location in said processor memory (201);

wherein said DMA transfer means (108) is also connected to said processor data bus and said interface means (102) and is responsive to said incoming state controller means (104) seizing said data, address and control busses for directly transferring the data portion of said data message into said activated memory store location via said processor data bus.

12. The invention of claim 11 wherein said pattern matcher means (105) includes:

address matcher means (111) connected to said interface means (102) and responsive to said header field of said data message for comparing on a byte-by-byte basis as received each byte of said header field to m match patterns stored in said address matcher means (111), where m is an integer; and wherein said address matcher is responsive to each of said comparisons for generating a byte-by-byte match signal indicating the byte-by-byte correspondence between said header field and said m match patterns.

13. The invention of claim 12 wherein said pattern matcher means (105) includes:

match register means (120-1 to 120-m, 112) connected to said address matcher means (111) and responsive to said byte-by-byte match signals for generating an m bit match sum signal indicative of the cumulative status of the m match pattern comparisons.

14. The invention of claim 13 wherein said pattern matcher means (105) includes:

class encoder means (106) connected to said match register means (120-1 to 120-m, 112) and responsive to said match sum signal for generating a class signal indicative of the one of the k possible classes of information that classifies said data message.

15. The invention of claim 14 wherein:

said DMA table means (107) is connected to said class encoder means (106) and is responsive to said class indication signal for generating said hardware address.

16. The invention of claim 14 wherein:

said class encoder means (106) is connected to said processor data, address and control busses and is responsive to signals appearing thereon for storing class translation information as determined by said processor (200) operating under control of a predefined algorithm stored in said processor.

17. The invention of claim 12 wherein:

said address matcher means (111) is connected to said processor data, address and control busses and is responsive to signals appearing thereon for storing match patterns as determined by said processor (200) operating under control of a predefined algorithm stored in said processor.

18. The invention of claim 12 wherein said channel interface circuit (100) includes:

state controller means (104) connected to said interface means (102) and said pattern matcher means (105) and responsive to said interface means (102) for generating a block address signal (BLOCK) indicative of which byte of said header has last been received by said interface means (102).

19. The invention of claim 18 wherein:

said pattern matcher means (105) is responsive to said block address signal (BLOCK) for simultaneously comparing said last received byte of said header field with a corresponding byte of each of said m match patterns.

20. The invention of claim 18 wherein:

said DMA transfer means (108) is connected to said state controller means (104) and is responsive to same for transmitting said data message to said processor memory (201) via said processor data bus.

21. The invention of claim 11 wherein:

said DMA table means (107) is connected to said processor data, address and control busses and is responsive to signals appearing thereon for storing hardware address information therein as determined by said processor (200) operating under control of a predefined algorithm stored in said processor.

* * * * *